(12) United States Patent
Islam

(10) Patent No.: US 7,298,534 B2
(45) Date of Patent: Nov. 20, 2007

(54) OFF-AXIS HOLOGRAPHIC LIGHT CONCENTRATOR AND METHOD OF USE THEREOF

(75) Inventor: Quazi T. Islam, Hopewell, VA (US)

(73) Assignee: Philip Morris USA Inc., Richmond, VA (US)

( * ) Notice: Subject to any disclaimer, the term of this patent is extended or adjusted under 35 U.S.C. 154(b) by 279 days.

(21) Appl. No.: 11/104,637

(22) Filed: Apr. 13, 2005

(65) Prior Publication Data

US 2005/0225817 A1    Oct. 13, 2005

Related U.S. Application Data

(60) Provisional application No. 60/561,516, filed on Apr. 13, 2004.

(51) Int. Cl.
*G02B 5/32* (2006.01)

(52) U.S. Cl. .............................. 359/15; 359/1; 398/212

(58) Field of Classification Search ................. 359/15, 359/1, 16, 19, 356; 250/237 R; 398/212
See application file for complete search history.

(56) References Cited

U.S. PATENT DOCUMENTS

| | | | |
|---|---|---|---|
| 4,028,104 A | | 6/1977 | Graube |
| 4,099,971 A | | 7/1978 | Graube |
| 4,500,163 A | * | 2/1985 | Burns et al. .................. 359/15 |
| 4,534,614 A | * | 8/1985 | Silverglate .................. 250/216 |
| 4,682,841 A | | 7/1987 | Afian et al. |
| 5,011,284 A | | 4/1991 | Tedesco et al. |
| 5,111,313 A | | 5/1992 | Shires |
| 5,633,498 A | * | 5/1997 | Savicki ........................ 250/353 |
| 6,348,684 B1 | * | 2/2002 | Nykolak et al. ............. 250/216 |
| 6,381,044 B1 | * | 4/2002 | Schuster et al. .............. 359/16 |
| 6,498,662 B1 | | 12/2002 | Schuster |
| 6,608,708 B1 | * | 8/2003 | Amadon et al. ............... 359/15 |
| 6,684,034 B2 | * | 1/2004 | Tseng .......................... 398/202 |
| 6,714,328 B2 | * | 3/2004 | Steiner ........................ 359/15 |
| 7,177,550 B1 | * | 2/2007 | Smith .......................... 398/212 |

FOREIGN PATENT DOCUMENTS

WO    WO 02/21734 A1    3/2002

OTHER PUBLICATIONS

Jivkova et al., "Holographic parabolic mirror as a receiver optical front end for wireless infrared communications: experimental study", *Applied Optics*, , vol. 41, No. 28m Oct. 1, 2002, pp. 5860-5865.

(Continued)

*Primary Examiner*—Leonidas Boutsikaris
(74) *Attorney, Agent, or Firm*—Buchanan Ingersol & Rooney PC

(57) ABSTRACT

A light receiving apparatus comprises a holographic optical device having a plurality of holograms recorded in a light receiving surface thereof. The holographic optical device is configured to diffract light of a predetermined wavelength incident thereon from different directions onto a common focal area. The holographic optical device is shaped such that a first vector normal to the light receiving surface at a first location thereon is oriented along a first direction and such that a second vector normal to the light receiving surface at a second location thereon is oriented along a second direction, the second direction being different from the first direction.

51 Claims, 13 Drawing Sheets

OTHER PUBLICATIONS

Kahn et al., "Imaging Diversity Receivers for High-Speed Infrared Wireless Communication", *IEEE Communications Magazine*, Dec. 1998, pp. 88-94.

Lin et al., "Efficient and Aberration-Free Wavefront Reconstruction from Holograms Illuminated at Wavelengths Differing from the Forming Wavelength", Applied Optics, vol. 10, No. 6, Jun. 1971, pp. 1314-1318.

Herzig, "Holographic Optical Elements (HOE) For Semiconductor Lasers", *Optics Communications*, vol. 58, No. 3, Jun. 1, 1986, pp. 144-148.

Han et al., "Accurate diffraction efficiency control for multiplexed volume holographic gratings", *Optical Engineering*, vol. 41, No. 11, Nov. 2002, pp. 2799-2802.

Kostuk, "Practical Design Consideration and Performance Characteristics of High Numerical Aperture Holographic Lenses", *SPIE*, vol. 1461, 1991, pp. 24-34.

O'Connor et al., "Polarization Properties of High Numerical Aperture Holographic Objectives", Optical Society of America (OSA) Meeting on Optical Data Storage, Technical Digest, Jan. 17-19, 1989, pp. 94-97.

Mohan et al., "Electronic speckle pattern interferometry with halo-optical element", *SPIE*, vol. 1821, 1992, pp. 234-242.

Syms et al., "Experimental and Theoretical Evaluation of the Efficiency of an Off-Axis Volume Holographic Lens", *Applied Physics B*, vol. 32, Aug. 1983, pp. 165-173.

Shakher et al., "Testing of off-axis parabola by holo-shear lens", SPIE, vol. 3739, May 1999, pp. 341-345.

* cited by examiner

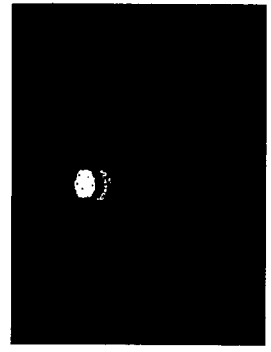
FIG. 11A
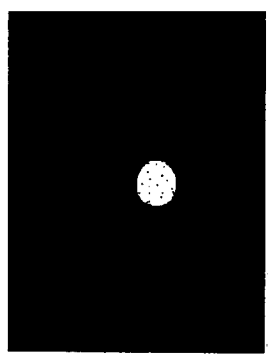
FIG. 11B
|  | Horizontal | | Vertical | |
|---|---|---|---|---|
|  | Beam | Gaussian | Beam | Gaussian |
| Centroid (μm) | 2623.77 | 2623.31 | 2245.08 | 2245.08 |
| Beam Peak (μm) | 2713.77 | 2623.31 | 2184.94 | 2245.08 |
| Width (μm) 81.6% | 380.53 | 307.43 | 351.75 | 306.17 |
| Width (μm) 50.0% | 611.57 | 571.05 | 592.35 | 568.72 |
| Width (μm) 13.4% | 714.31 | 972.41 | 712.75 | 968.44 |
| Correlation (%) | 87.87 | | 84.61 | |
| Power (mW) | 5.735 | | | |
FIG. 11C
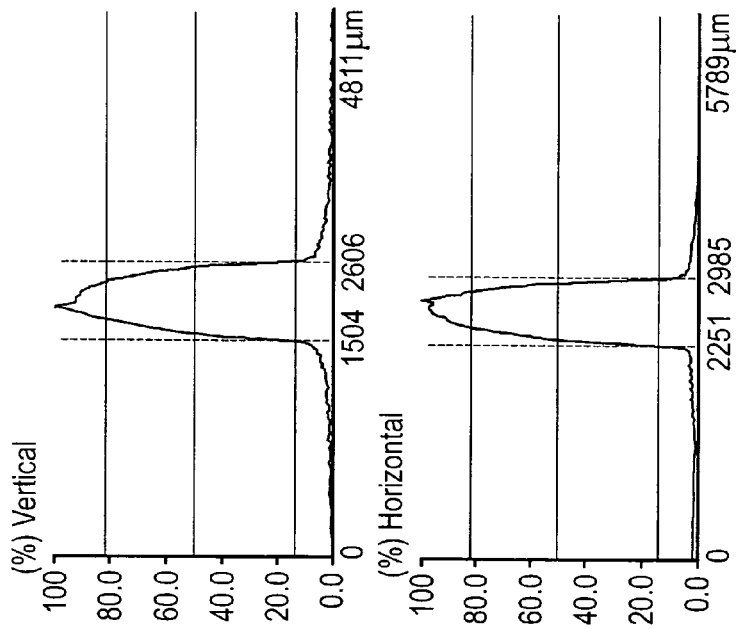
FIG. 11D

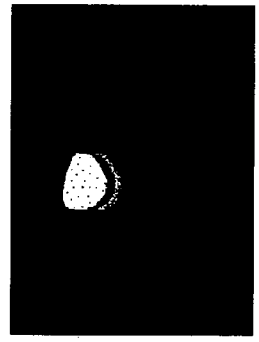
FIG. 13A
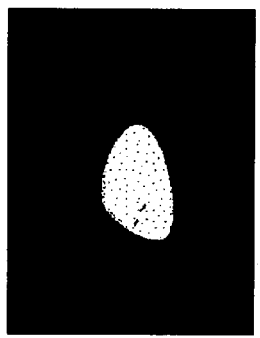
FIG. 13B
|  | Horizontal | | Vertical | |
| --- | --- | --- | --- | --- |
|  | Beam | Gaussian | Beam | Gaussian |
| Centroid (μm) | 2677.59 | | 2225.03 | |
| Beam Peak (μm) | 2496.67 | 2677.59 | 2164.90 | 2225.03 |
| Width (μm) 81.6% | 1036.87 | 858.49 | 774.36 | 650.27 |
| Width (μm) 50.0% | 1689.67 | 1594.66 | 1209.92 | 1207.88 |
| Width (μm) 13.4% | 2013.26 | 2715.46 | 1417.13 | 2056.84 |
| Correlation (%) | 82.56 | | 81.58 | |
| Power (mW) | 26.556 | | | |
FIG. 13C
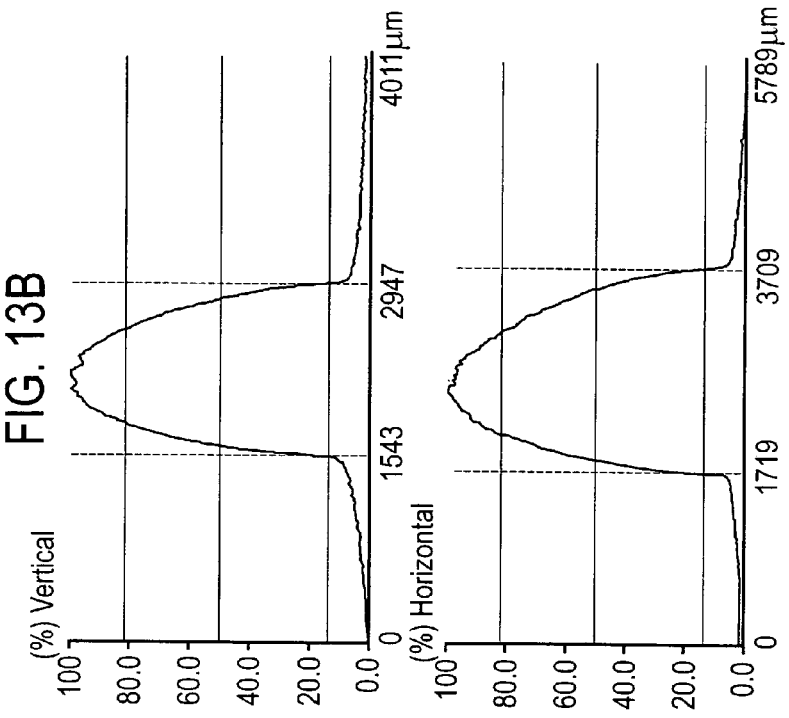
FIG. 13D

OFF-AXIS HOLOGRAPHIC LIGHT CONCENTRATOR AND METHOD OF USE THEREOF

CROSS REFERENCE TO RELATED APPLICATIONS

This application claims priority under 35 U.S.C. §119(e) to U.S. provisional Application No. 60/561,516 filed on Apr. 13, 2004, the entire content of which is incorporated herein by reference.

BACKGROUND

Methods are known in the art for using lenses and holographic optical elements (HOEs) to direct infrared optical signals onto a detector for use in wireless infrared communication. See, for example, Jivkova et al., "Holographic Parabolic Mirror as a Receiver Optical Front End For Wireless Infrared Communications: Experimental Study," Applied Optics, Vol. 41, No. 28, October 2002, pp. 5860-5865. U.S. Pat. No. 4,534,614 to Silverglate discloses an optical signal detection apparatus for use in diffuse infrared light communication comprising an aspherical lens, a filter and a photodetector. International Publication No. WO 02/21734 A1 to Green et al. discloses a wireless communication receiver comprising a dielectric totally internally reflecting concentrator having a convex receiving surface (i.e., a dielectric lens), a filter and a photodetector. U.S. Pat. No. 4,682,841 to Afian et al. discloses a holographic light radiation concentrator comprising at least two concentrating facets arranged in a planar configuration. Kahn et al., "Imaging Diversity Receivers for High-Speed Infrared Wireless Communication," IEEE Communications Magazine, December 1998, pp. 88-94, describes several types of receivers for high-speed infrared wireless communication. U.S. Pat. No. 6,498,662 to Schuster discloses an optical receiver comprising HOEs arranged in a planar configuration. U.S. Pat. No. 4,028,104 to Graube, the entire disclosure of which is incorporated herein by reference, discloses making an infrared hologram using the Herschel reversal effect. U.S. Pat. No. 4,099,971 to Graube, the entire disclosure of which is incorporated herein by reference, discloses fabrication of infrared holograms by recording using a visible wavelength and then treating the hologram to make it swell, thereby altering the fringe spacings and making it suitable for playback in the infrared.

Lin et al., "Efficient and Aberration-free Wavefront Reconstruction from Holograms Illuminated at Wavelengths Differing from the Forming Wavelength," Applied Optics, Vol. 10, No. 5, June 1971, pp. 1314-1318, discloses a method of preparing a HOE for use at 633 nm in dichromated gelatin, which is not sensitive to light at 633 nm. Herzig, "Holographic Optical Elements (HOE) for Semiconductor Lasers," Optics Communications, Vol. 58, No. 3, June 1986, pp. 144-148, discloses a multi-step process for preparing an infrared HOE comprising recording a first hologram H1 with an HeNe laser at 633 nm, reconstruction of the hologram H1 with a plane wave from an argon laser at 514 nm, recording a second hologram H2 with an astigmatic wave provided by the hologram H1 and a plane reference wave at 514 nm, and reconstruction of the hologram H2 with a plane wave from a GaAs laser at 800 nm that produces a desired spherical wave. U.S. Pat. No. 6,381,044 to Schuster et al., the entire disclosure of which is incorporated herein by reference, discloses a method and apparatus for correcting aberrations in an HOE recorded at a visible wavelength for reconstruction at an infrared wavelength.

Another type of HOE referred to as a holographic shear lens is also known. Holographic shear lenses can generate multiple image points from one object point and can be useful in imaging and measurement applications, such as disclosed in N. Mohan et al., "Electronic speckle pattern interferometry with holo-optical element," Proceedings SPIE Vol. 1821, pp. 234-242, 1992, and in optical testing applications, such as disclosed in C. Shakher et al., "Testing of off-axis parabola by holo-shear lens," Proceedings SPIE Vol. 1999, pp. 341-345, 1999.

Han et al., "Accurate diffraction efficiency control for multiplexed volume holographic gratings," Optical Engineering, Vol. 41, No. 11, November 2002, pp. 2799-2802, discloses a method for controlling and estimating diffraction efficiency for a HOE with multiple recording exposures. Kostuk, "Practical Design Considerations and Performance Characteristics of High Numerical Aperture Holographic Lenses," SPIE Vol. 1461, Practical Holography V, 1991, pp. 24-34, discusses factors affecting diffraction efficiency of holographic lenses, such as recording geometry and recording material. O'Connor et al., "Polarization Properties of High Numerical Aperture Holographic Objectives," Optical Society of America (OSA) Meeting on Optical Data Storage, Technical Digest, pp. 94-97, Los Angeles, Calif., Jan. 17-19, 1989, discloses that diffraction efficiency of a HOE can be affected by the reference beam angle used to record the HOE.

U.S. Pat. No. 5,111,313 to Shires discloses an electronic autostereoscopic display comprising a cylindrical HOE for displaying 3D images.

While various configurations of HOEs and lenses for use as light concentrators in wireless optical receivers have been disclosed as discussed above, there is need for a simple and inexpensive light receiving apparatus comprising a holographic light concentrator that is suitable for use in a multidirectional or omnidirectional receiver for wireless optical data communication.

SUMMARY OF THE INVENTION

According to one embodiment, a light receiving apparatus comprises a holographic optical device having a plurality of holograms recorded in a light receiving surface thereof. The holographic optical device is configured to diffract light of a predetermined wavelength incident thereon from different directions onto a common focal area. The holographic optical device is shaped such that a first vector normal to the light receiving surface at a first location thereon is oriented along a first direction and such that a second vector normal to the light receiving surface at a second location thereon is oriented along a second direction, the second direction being different from the first direction.

According to another embodiment, a method of collecting optical signals comprises receiving first light of a predetermined wavelength comprising a first optical signal at a first location of a holographic optical device, the holographic optical device having a plurality of holograms recorded in a light receiving surface thereof, wherein a first vector normal to the light receiving surface at the first location is oriented along a first direction. The method also comprises diffracting the first light with the holographic optical device onto a focal area. The method also comprises receiving second light of the predetermined wavelength comprising a second optical signal at a second location of the holographic optical device, wherein a second vector normal to the light receiving surface at the second location is oriented along a second direction different from the first direction. The method also comprises diffracting the second light with the holographic optical device onto the focal area.

BRIEF DESCRIPTION OF THE DRAWINGS

FIG. 1b is a top view of the apparatus illustrated in FIG. 1a.

FIG. 1c is a side view of the apparatus illustrated in FIG. 1a.

FIG. 2b is a top view of the apparatus illustrated in FIG. 2a.

FIG. 11 is a diffracted spot evaluation for an off-axis HOE light concentrator reconstructed with full normal illumination.

FIG. 13 is a diffracted spot evaluation for an off-axis HOE light concentrator reconstructed with full illumination.

DETAILED DESCRIPTION

Described herein is a light receiving apparatus that is suitable for use in a multidirectional or omnidirectional receiver for optical data communication. The optical data preferably comprises wireless optical data. The light receiving apparatus can be used, for example, in a manufacturing environment (e.g., cigarette manufacturing) to communicate manufacturing parameters or in a warehouse environment to communicate inventory and/or environmental parameters. The light receiving apparatus can be used in any device that utilizes wireless optical communication such as, for example, televisions, VCRs, DVD players/recorders, or any other electronic device that utilizes an optical (e.g., infrared) remote control. For example, the light receiving apparatus can be used in portable computers or hand-held devices such as personal digital assistants (PDAs) or wireless telephones that have a wireless optical communication port. In one embodiment, the light receiving apparatus can increase the optical-link distance of an optical wireless link (e.g., an infrared link) and can improve the signal-to-noise ratio of an optical signal of a given wavelength detected by a detector in ambient light. In another embodiment, the light receiving apparatus can enable multiple light transmitting and/or receiving devices located at different positions relative to the light receiving apparatus (e.g., distributed around the light receiving apparatus over a predetermined angular range, such as 90, 180 or 360 degrees) to communicate optically with the light receiving apparatus.

The light receiving apparatus can be configured to receive light that is transmitted from one or more light sources (e.g., lasers or light-emitting diodes), optionally through a light modulation component (e.g., liquid-crystal light modulators), to the light receiving apparatus via different light transmission media such as free space (e.g., wireless communication) or fibers.

Figure 1A:
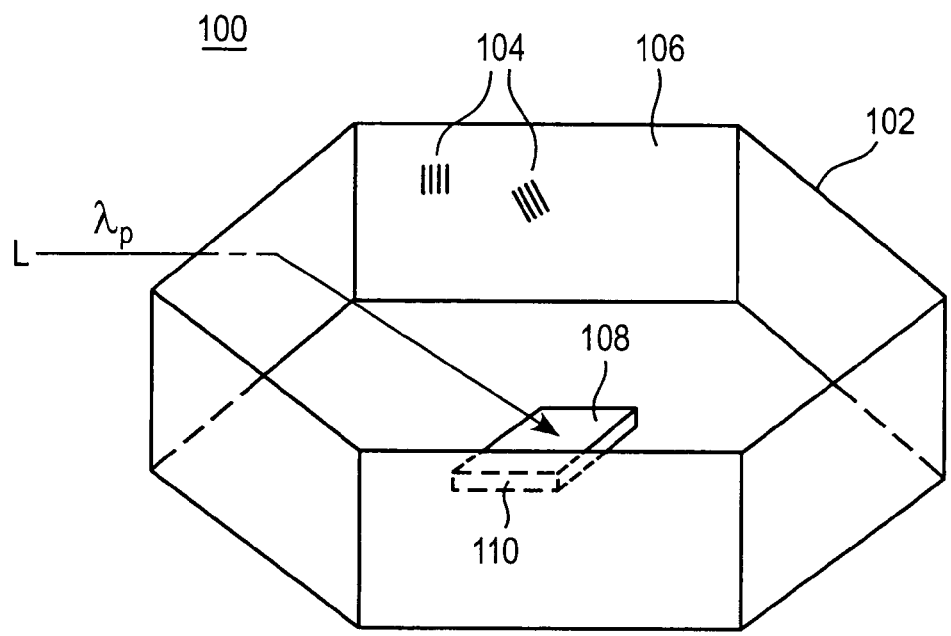
FIG. 1a is a schematic illustration in perspective view of an exemplary light receiving apparatus.
Figure 1B:
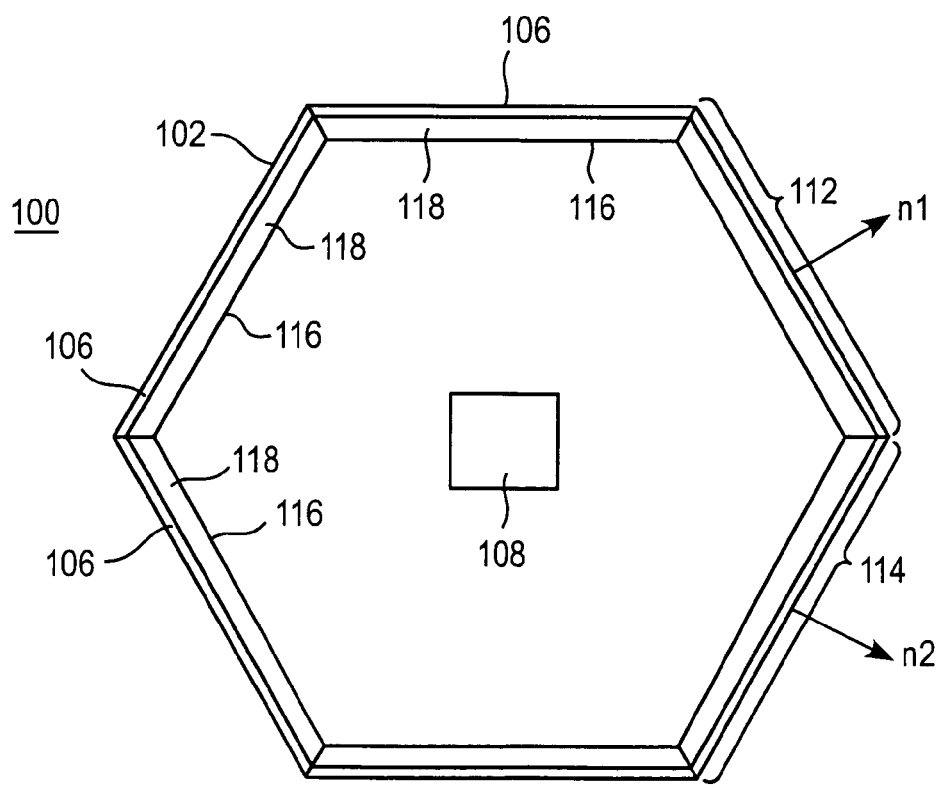

FIG. 1a illustrates in perspective view an exemplary light receiving apparatus 100. The light receiving apparatus 100 comprises a holographic optical device 102 having a plurality of holograms 104 recorded in a light receiving surface 106 thereof. For ease of illustration, only two holograms 104 are shown in FIG. 1a, but it will be understood that many holograms 104 can be recorded in the light receiving surface 106. The holographic optical device 102 is preferably configured to diffract light L of a predetermined wavelength λp incident thereon from different directions onto a common focal area 108. Thus, the holographic optical device 102 can serve as a holographic light concentrator. A detector 110, such as an infrared detector, can be positioned at the focal area 108 to collect light diffracted and focused by the holographic optical device 102. In addition, as illustrated in FIG. 1b, the holographic optical device 102 can be shaped such that a first vector normal to the light receiving surface 106 at a first location 112 thereon is oriented along a first direction n1 and such that a second vector normal to the light receiving surface 106 at a second location 114 thereon is oriented along a second direction n2, the second direction n2 being different from the first direction n1. The holographic optical device 102 can also be viewed as an off-axis device (an off-axis holographic light concentrator), because the incident light beam L does not necessarily intersect the plane of the focal area 108.

As shown in the example of FIG. 1b, the holographic optical device 102 can comprise a plurality of holographic optical elements (HOEs) 116. The plurality of HOEs 116 can be arranged edge to edge to surround the focal area 108 in two dimensions (e.g., in the x-y plane). Also, as illustrated in the example of FIGS. 1a and 1b, the plurality of HOEs 116 can be arranged in a hexagonal configuration. In addition, configurations with a different number of sides can also be used, such as an octagonal configuration or configurations with 7, 9, 10, 11, 12, or more sides.

The holographic optical device 102 can be constructed such that the holographic optical device 102 is centered about the focal area 108. Alternatively, the holographic optical device 102 can be constructed such that the focal area 108 is displaced from the center of the holographic optical device 102.

Figure 1C:
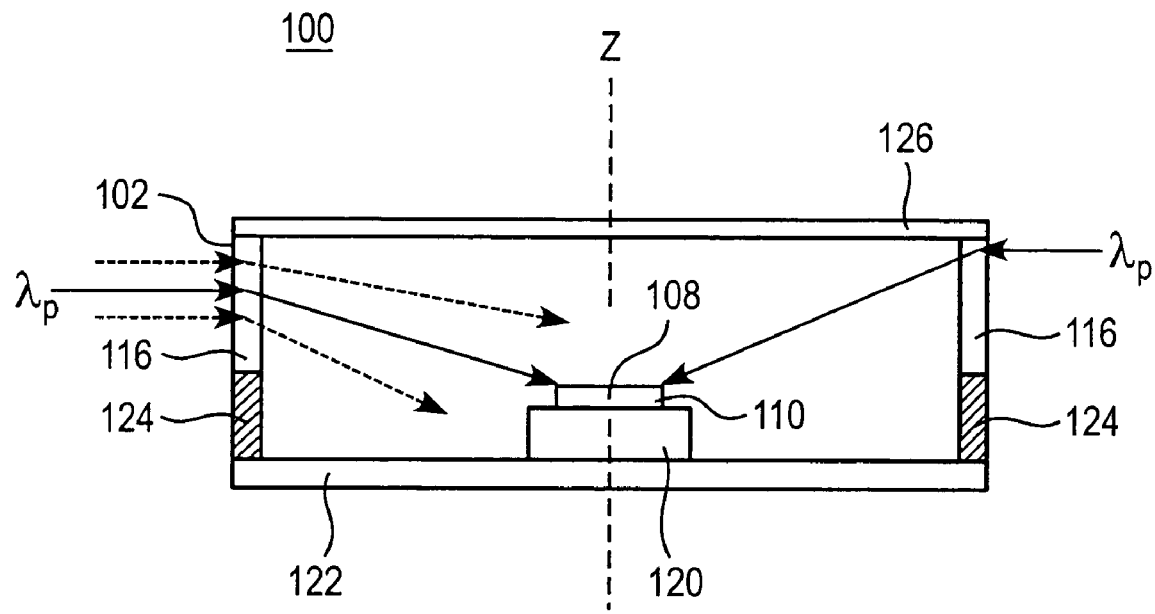

FIG. 1c is a side view of the light receiving apparatus 100 illustrated in FIG. 1a. As illustrated in FIG. 1c, the light receiving apparatus 100 can further comprise a base 122 upon which the HOEs 116 are supported. In addition, the light receiving apparatus 100 can also comprise a cover 126 that seals the light receiving apparatus 100 against contaminants such as dust and moisture. In one arrangement, the light receiving apparatus 100 can be configured to receive light only from lateral directions, and therefore the cover 126 can be made of an opaque material. However, in another arrangement, the cover 126 can also serve as a holographic optical element having a light receiving surface with a plurality of holograms recorded therein so that light may enter the device from both lateral and vertical directions and directions therebetween. As used herein, a vertical direction is a direction substantially perpendicular to the plane formed by focal area 108, and a lateral direction is a direction substantially coplanar with the plane formed by focal area 108. In addition, as illustrated in FIG. 1c, the light receiving apparatus can further comprise a support member 120 that supports the detector 110. The detector 110 can be used to convert an optical signal to an electrical signal, and electrical connections (not shown) carrying the electrical signal can be taken out of the light receiving apparatus 100 through the support member 120 and the base 122, and can be input into an appropriate processing unit coupled to the detector 110 (e.g., a processing unit of a communication device). In addition, as illustrated in the example of FIG. 1c, the HOEs 116 can comprise opaque portions 124 having no holograms recorded therein. These portions can be provided at locations where the geometrical design of the light receiving apparatus 100 would prevent such incident light from being diffracted, since it would not fall on the focal area 108. This can be advantageous because it can reduce the cost of recording materials.

As illustrated in FIG. 1c, light of the predetermined wavelength λp illustrated by solid lines, or light of a narrow band of wavelengths centered about λp, can be diffracted by the holographic optical device 102 onto the focal area 108. The HOEs 116 are preferably recorded such that the focal points of the HOEs 116 substantially coincide in a small area centered on a geometrical axis Z of the apparatus 100. Light of other wavelengths illustrated by dotted lines in FIG. 1c is not concentrated at the same focal area 108 due to dispersion. Thus, a small-area detector, such as detector 110, placed at the focal area 108 will have a higher signal for the predetermined wavelength compared to a situation where a holographic optical device 102 is not used. For the light receiving apparatus 100 illustrated in FIG. 1c, non-desirable light outside the predetermined wavelength λp incident from the same direction as light of the predetermined wavelength λp will either not be incident on the detector 110, or the illuminance on the detector 110 will be small. In either case, utilizing a holographic optical device 102 such as illustrated in FIG. 1c can improve the signal-to-noise ratio at the detector for the predetermined wavelength λp.

Light receiving apparatuses as described herein, such as illustrated in FIGS. 1a-1c, for example, can be used in a wireless optical communication system, such as an infrared wireless optical network. For example, a light receiving apparatus as described herein can be mounted on the ceiling of a room where wireless optical communication is desired such that the light receiving surface of the detector 110 faces downward, or on a wall of a room such that the light receiving surface of the detector 110 faces sideways. As another example, a light receiving apparatus as described herein can be placed on a table to communicate with one or more wireless communication devices (e.g., laptop computers or hand-held devices such as PDAs and wireless telephones). Also, a light receiving apparatus as described herein can be utilized, for example, in an infrared wireless communication system implementing standards and protocols established by the Infrared Data Association (IrDA). Wireless infrared communication signals in accordance with such standards and protocols typically utilize a wavelength of 875 nm±30 nm (i.e., in the range of 845-905 nm). However, the light receiving apparatus 100 is not limited to use at infrared wavelengths and could be used, for example, at visible and ultraviolet wavelengths, and at infrared wavelengths other than those noted above. Preferably, the predetermined wavelength can be selected from the wavelength range of 845-905 nm, and nominally can be chosen at approximately 875 nm.

Figure 1D:
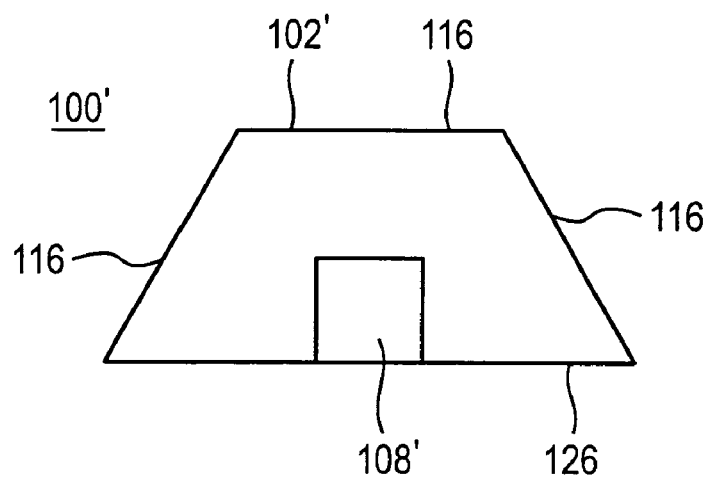
FIG. 1d is a top schematic view of another exemplary light receiving apparatus.

Holographic optical devices as described herein can be configured to receive light from an angular range of up to 360°, such as illustrated in the example of FIGS. 1a and 1b. For example, as illustrated in FIGS. 1a and 1b, light can enter all six light receiving surfaces 106 corresponding to the six HOEs 116. Alternatively, holographic optical devices as described herein can be configured to receive light from a smaller angular range of up to, for example, 330°, 300°, 270°, 240°, 210°, 180°, 150°, 120°, 90°, or 60°. For example, FIG. 1d shows, in top view, a light receiving apparatus 100' comprising a holographic optical device 102' constructed in a half-hexagon configuration. In particular, the holographic optical device 102' comprises three HOEs 116 such as discussed above arranged in a half-hexagon configuration and having a common focal area 108' located adjacent to a long side 126 of the half-hexagon. The vector normal to the focal area 108' can be either parallel to, or perpendicular to the long side 126. Such a configuration can be useful, for example, for placement on a side wall of a room where wireless infrared communication is desired. Of course, a holographic optical device as described herein can be constructed to receive light from any desired angular range, and is not limited to angular ranges of 360° or 180°. Preferably, such a holographic optical device is configured to receive light from an angular range of at least 60° to provide sufficient angular coverage to facilitate wireless optical communication within a conventional building setting.

In another embodiment, the holographic optical device of the light receiving apparatus can have a cylindrical shape. For example, as illustrated in perspective view in FIG. 2a, there is shown an exemplary light receiving apparatus 200. The light receiving apparatus 200 comprises a holographic optical device 202 having a plurality of holograms 204 recorded in a light receiving surface 206 thereof. The holographic optical device 202 is configured to focus light of a predetermined wavelength λp incident thereon from different directions onto a common focal area 208. Moreover, the holographic optical device 202 is shaped such that a first vector normal to the light receiving surface 206 at a first location 212 thereon is oriented along a first direction n1 and such that a second vector normal to the light receiving surface 206 at a second location 214 thereon is oriented along a second direction n2, the second direction n2 being different from the first direction n1. The first and second directions n1 and n2 can intersect, but this is not necessary. If the first and second directions intersect, the angle between the first and second directions can be in a range of up to, for example, 45°, 60°, 90°, 120°, 150°, 180°, 210°, 240°, 270°, 300°, 330° or 360°. The holographic optical device 202 can be formed from any suitable plastic or polymer deformable sheet on which or in which is formed any suitable holographic emulsion, such as, for example, silver halide or dichromated gelatin. As is evident from FIGS. 2a and 2b, the exemplary light receiving apparatus 200 can receive light from an angular range of up to 360°. In this example, the holographic optical device 202 comprises a single HOE, which corresponds to the holographic optical device 202 itself.

Figure 2A:
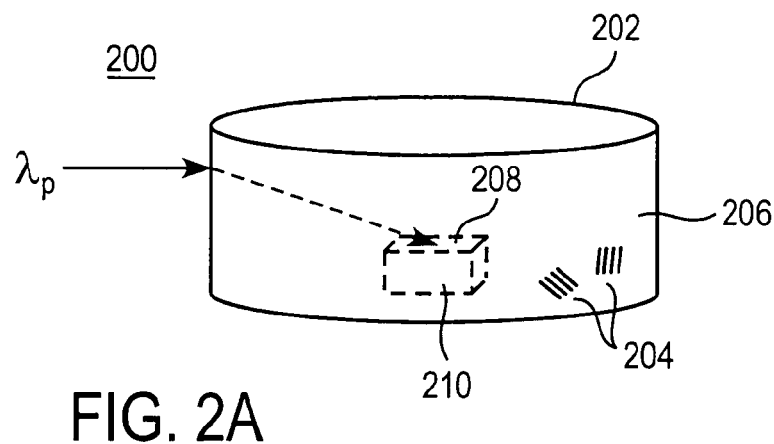
FIG. 2a is a schematic illustration in perspective view of another exemplary light receiving apparatus.
Figure 2B:
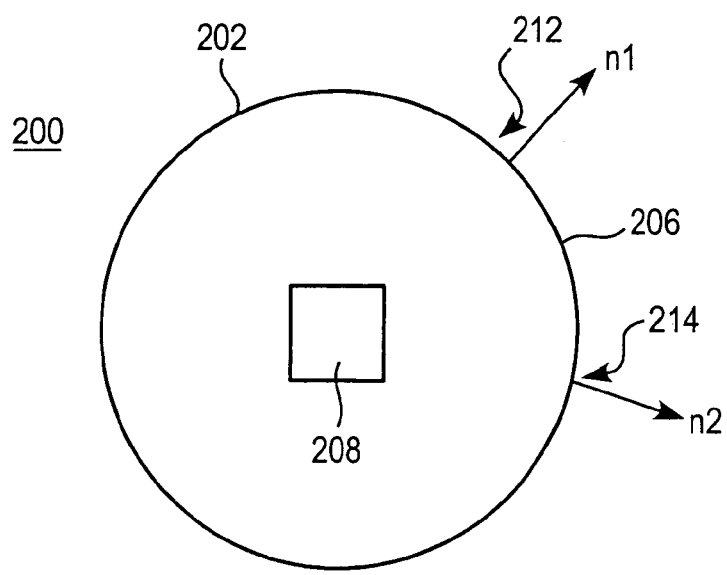
Figure 2C:
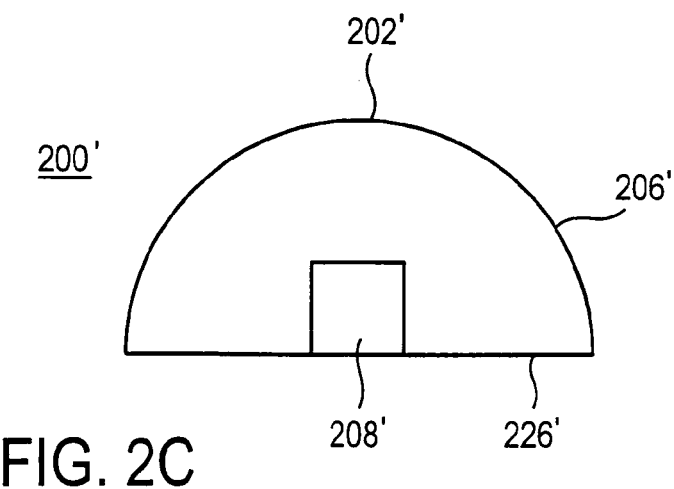
FIG. 2c is a top schematic view of another exemplary light receiving apparatus.

In a variation of the exemplary light receiving apparatus 200 illustrated in FIGS. 2a and 2b, a half-cylindrical configuration can be utilized for a light receiving apparatus, such as illustrated in top view in FIG. 2c. FIG. 2c illustrates an exemplary light receiving apparatus 200' comprising a holographic optical device 202' in the shape of a half cylinder. The holographic optical device 202' has a light receiving surface 206' in which are recorded a plurality of holograms (not shown). The holographic optical device 202' is configured to have a focal area 208' (e.g., corresponding to the light receiving surface of a detector) arranged along a diameter 226' of the half cylinder. Such a half-cylinder configuration can be useful where it is desired to collect light from an angular range of up to 180° (e.g., for a wall mounting configuration or for mounting on a surface of a portable computer or hand-held device).

Figure 3:
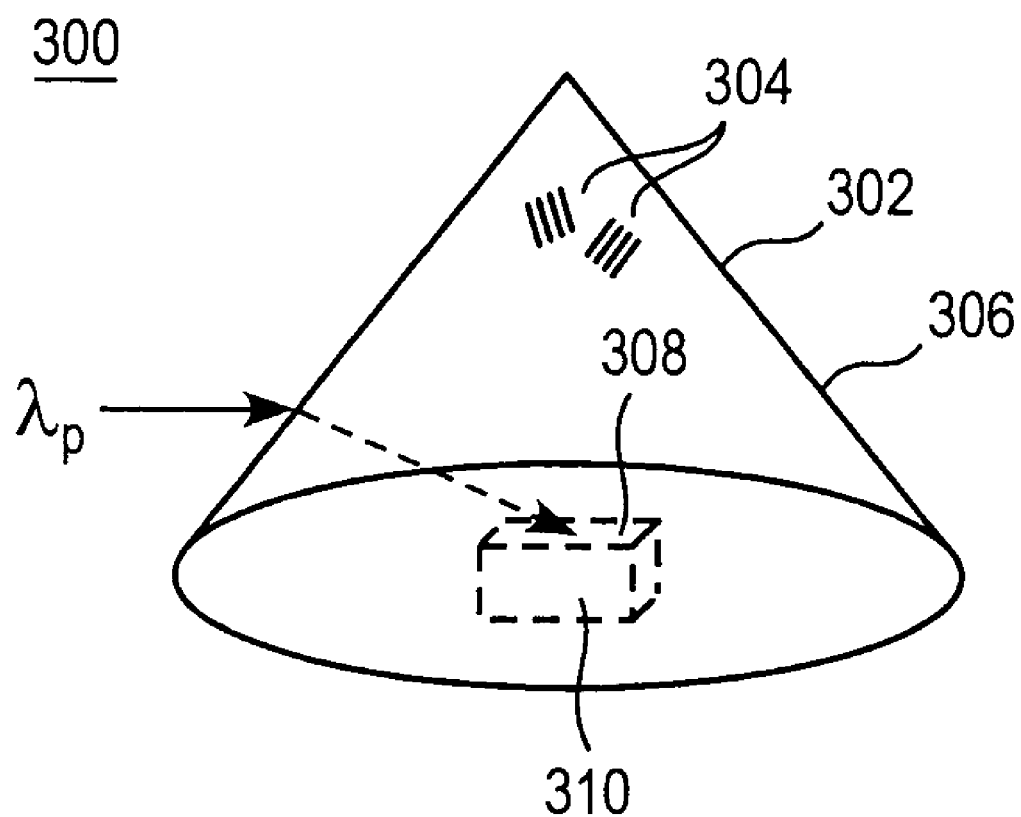
FIG. 3 is a schematic illustration in perspective view of another exemplary light receiving apparatus.

According to another embodiment, the holographic optical device of the light receiving apparatus can have a conical shape. For example, as illustrated in perspective view in FIG. 3, there is shown an exemplary light receiving apparatus 300 comprising a holographic optical device 302 having a plurality of holograms 304 recorded in a light receiving surface 306 thereof. The holographic optical device 302 is configured to focus light of a predetermined wavelength $\lambda p$ incident thereon from different directions onto a common focal area 308 (e.g., the light receiving surface of a light detector 310). The holographic optical device 302 is shaped such that a first portion of the light receiving surface 306 faces a first direction and a second portion of the light receiving surface faces a second direction, the second direction being different from the first direction. In this regard, a top view of the light receiving apparatus 300 is similar to the top view of the light receiving apparatus 200 illustrated in FIG. 2b. Accordingly, no further description of a top view of the light receiving apparatus 300 is necessary. The holographic optical device 302 can be formed from any suitable plastic or polymer deformable sheet on which or in which is formed any suitable holographic emulsion, such as, for example, silver halide or dichromated gelatin.

Figure 4:
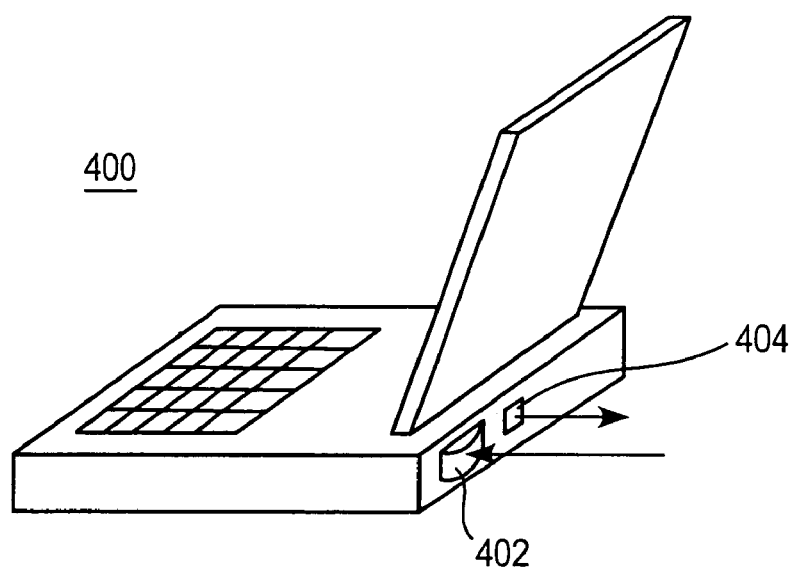
FIG. 4 is a schematic illustration in perspective view of an exemplary wireless communication apparatus utilizing a light receiving apparatus.

According to another embodiment, a light receiving apparatus as described herein can be used in portable computers, hand-held devices such as personal digital assistants (PDAs) and wireless telephones, and other electronic devices that utilize optical (e.g., infrared) remote controls. As an example, FIG. 4 illustrates an exemplary laptop computer 400 comprising a light receiving apparatus 402 such as described above. The light receiving apparatus 402 receives an optical signal (e.g., a wireless infrared communication signal consistent with IrDA standards and protocols), which can then be processed by an internal processor of the laptop computer 400 in any suitable manner. The laptop computer 400 also comprises a light transmission port 404 having a light transmitting element that transmits an optical signal (e.g., a wireless infrared light signal) to another suitable light communication device, such as a light receiving apparatus as described herein. A light receiving apparatus similar to light receiving apparatus 402 illustrated in FIGS. 1d, 2c and 4, for example, can also be used in other devices that utilize wireless optical communication such as, for example, televisions, VCRs, DVD players/recorders, or any other electronic device that utilizes an optical (e.g., infrared) remote control.

Light receiving apparatuses comprising holographic optical devices as described herein can preferably increase the optical-link distance and performance of an optical wireless link and/or improve the signal-to-noise ratio of an optical signal having a specified wavelength detected in ambient light. Such advantages can be achieved because the holographic optical device can focus a greater amount of the optical signal light onto a detector than would be achieved without the holographic optical device. In addition, use of a light receiving apparatus as described herein with remotely controlled electronic devices also allows the possibility of reducing the intensity of optical radiation emitted by the remote control while maintaining good optical-link performance and distance, thereby reducing power consumption in the remote control. Further, multiple portable transmitters or transceivers, such as portable computers or hand-held devices with optical communication ports, can be located surrounding a transceiver that comprises a holographic optical device and detector as described herein to communicate with a computer or server coupled to the transceiver. The optical communication ports of the portable transceivers can also be equipped with holographic optical devices such as illustrated in FIGS. 1d, 2c and 4, for example. Such an arrangement of a central transceiver and one or more portable transceivers can provide an improvement of the signal-to-noise ratio of an infrared wireless link in ambient light.

Any suitable detector, such as an infrared detector, can be used in conjunction with holographic optical devices as described herein, and such detectors and holographic optical devices can have a range of sizes. In an exemplary embodiment, an infrared detector having a light receiving area approximately 5 mm×5 mm in size can be used in conjunction with a hexagonal arrangement of HOEs, such as illustrated in FIGS. 1a-1c, each HOE being approximately 63 mm×63 mm in size. Of course, these dimensions are only exemplary and are not intended to be restrictive. For example, holographic optical devices as described herein for use in transceivers for communication within a room of a building can have overall widths in the range of approximately 10-50 cm and heights in the range of approximately 5-15 cm. Also, for example, an optical communication port of a portable computer or hand-held device can be equipped with a holographic optical device having an overall width in the range of approximately 10-30 mm and an overall height in the range of approximately 5-15 mm, which can focus signal light onto a detector having a size in the range of approximately 2-5 mm×2-5 mm.

Holographic optical devices as described herein can be constructed from any suitable holographic recording medium or emulsion. For example, the HOEs 116 illustrated in FIGS. 1a-1c can comprise glass sheets upon which a holographic film of dichromated gelatin or silver halide (e.g., Slavich PFG-01) is formed. Alternatively, holographic optical devices as described herein can be formed of any suitable holographic emulsion formed on or in a plastic or polymer sheet such as one or more DuPont photopolymers. The plastic or polymer sheet can be rigid or deformable.

Figure 5:
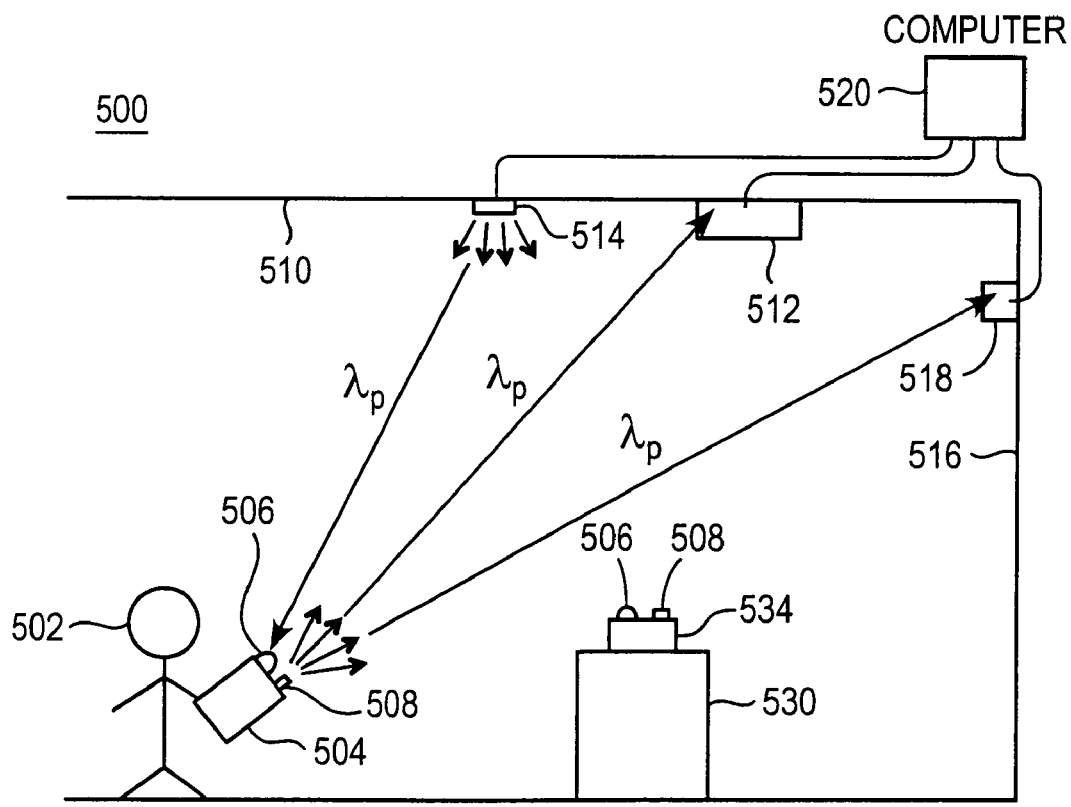
FIG. 5 is a schematic view of a wireless communication network that utilizes hand-held wireless devices.

According to another embodiment, light receiving apparatuses as described herein can be utilized in hand-held or stationary light-communication devices, and in ceiling and/or wall-mounted receivers/transceivers, in conjunction with a wireless optical communication network. For example, FIG. 5 is a schematic view of an exemplary optical wireless communication network 500. The network 500 can be implemented, for example, in a warehouse environment (e.g., for housing cigarette inventory), in a manufacturing environment (e.g., cigarette manufacturing), or in an environment that includes both inventory and manufacturing activities, as well as other activities. The network 500 can include one or more hand-held light-communication devices 504 and/or one or more stationary light-communication devices 534, all of which can be equipped with light receiving apparatuses 506 as described herein and/or light transmitting elements 508 for analog or digital optical communication. For example, a user 502 can be equipped with a hand-held light-communication device 504, which can be a hand-held computer for recording and communicating inventory parameters and/or environmental parameters (e.g., temperature, humidity, etc.) in an inventory environment. As another example, a piece of manufacturing equipment 530 can be equipped with stationary light-communication device 534, which can be interfaced with the manufacturing equipment 530 to monitor and communicate manufacturing information, such as, for example, quality-control information (e.g., rate of cigarettes failing a visual inspection) or other manufacturing parameters (e.g., number and rate of cigarettes packaged, processing temperature, etc.). The stationary light-communication device 534 need not be mounted directly on the manufacturing equipment and can be mounted on any suitable structure either temporarily or permanently.

The hand-held device 504 and the stationary device 534 each comprise a light receiving apparatus 506 such as has been described herein. The light receiving apparatus 506 receives an optical signal (e.g., a wireless optical signal) of a predetermined wavelength λp. A light transmitting element 508 that transmits an optical communication signal of the predetermined wavelength λp can also be provided on the hand-held device 504 and the stationary device 534. On a ceiling 510 is mounted another light receiving apparatus 512 such as has been described herein (e.g., with regard to FIGS. 1*a*, 2*a*, and 3). Also mounted on the ceiling 510 is a light transmitting device 514 that transmits an optical signal of the predetermined wavelength λp. Alternatively, the light transmitting device 514 can be mounted on a wall 516 if desired, or multiple light transmitting devices 514 can be mounted on the ceiling 510 and/or the wall 516. Another light receiving apparatus 518 as described herein (e.g., in connection with FIGS. 1*d* and 2*c*) can be mounted on the wall 516 in addition to or in place of the light receiving apparatus 512. Of course it is not necessary for the device 504 to be a hand-held device, and the device 504 could be a stationary device fixedly mounted to and/or in communication with any suitable piece of manufacturing or monitoring equipment or other suitable structure.

As illustrated in FIG. 5, the hand-held device 504 and the stationary device 534 can receive a wireless optical signal from the transmitter 514, and the devices 504 and 534 can transmit a wireless optical signal to either or both of the light receiving apparatuses 512 and 518. The transmitter 514 and the light receiving apparatuses 512 and 518 are configured to communicate with a central computer 520 (e.g., via electrical connections, optical fiber, or other wireless network). In addition, the hand-held light-communication device 504 and the stationary light-communication device 534 can each comprise a processing unit configured to process a wireless optical signal received by the light detector within the light receiving apparatus 506 of each of the devices 504 and 534. In this regard, processing a wireless optical signal can comprise, for example, updating a memory based upon information present in the wireless optical signal, calculating parameters based upon information present in the wireless optical signal, dividing data representing such information into data packets for communication, and/or any other desired type of processing of data representing information present within the wireless optical signal. The wireless optical signal can comprise cigarette manufacturing information or cigarette inventory information, for example, and the processing unit can be programmed to process such cigarette manufacturing and/or inventory information. As noted above, a light receiving apparatus as described herein can be used to increase the link distance of an infrared wireless link and/or improve the signal-to-noise ratio of a signal detected by a detector in ambient light, and can therefore improve the performance of a wireless optical communication network such as illustrated in FIG. 5.

Considerations pertaining to preparation of a holographic optical device or element will now be discussed. A conventional way to record an infrared hologram is to record the hologram using an optical wavelength at which a suitable holographic emulsion is sensitive (e.g., a visible wavelength for dichromated gelatin or silver halide) using optical parameters that will provide for desired performance during reconstruction (playback) at a desired infrared wavelength. In particular, for a desired playback wavelength (e.g., an infrared wavelength), a particular diffraction angle may be desired. By knowing the desired playback wavelength and the desired diffraction angle, a corresponding fringe spacing of the desired hologram can be calculated using the Bragg relation $n\lambda = d \sin \theta$, where n is the order of the diffraction, λ is the wavelength of the light, d is the fringe spacing, and θ is the desired diffraction angle. The calculated fringe spacing can then be used to determine an appropriate recording angle for the recording wavelength by substituting the recording wavelength into the Bragg relation and solving for the recording angle. In particular, for a given desired diffraction angle $\theta_{IR}$ for a desired infrared wavelength $\lambda_{IR}$, the recording angle in a visible wavelength is given by $\sin \theta_V = (\lambda_V \sin \theta_{IR})/\lambda_{IR}$, where $\lambda_V$ is the visible wavelength, $\theta_V$ is the visible recording angle, $\lambda_{IR}$ is the infrared wavelength and $\theta_{IR}$ is the desired infrared diffraction angle.

While recording an infrared hologram using a visible wavelength in this manner typically results in undesired aberrations, such aberrations can be reduced or avoided using known techniques, such as disclosed by Herzig, "Holographic Optical Elements (HOE) for semiconductor lasers" and by U.S. Pat. No. 6,381,044, referred to above. The recording method can comprise a multiple-exposure process or a single-exposure process.

Figure 6:
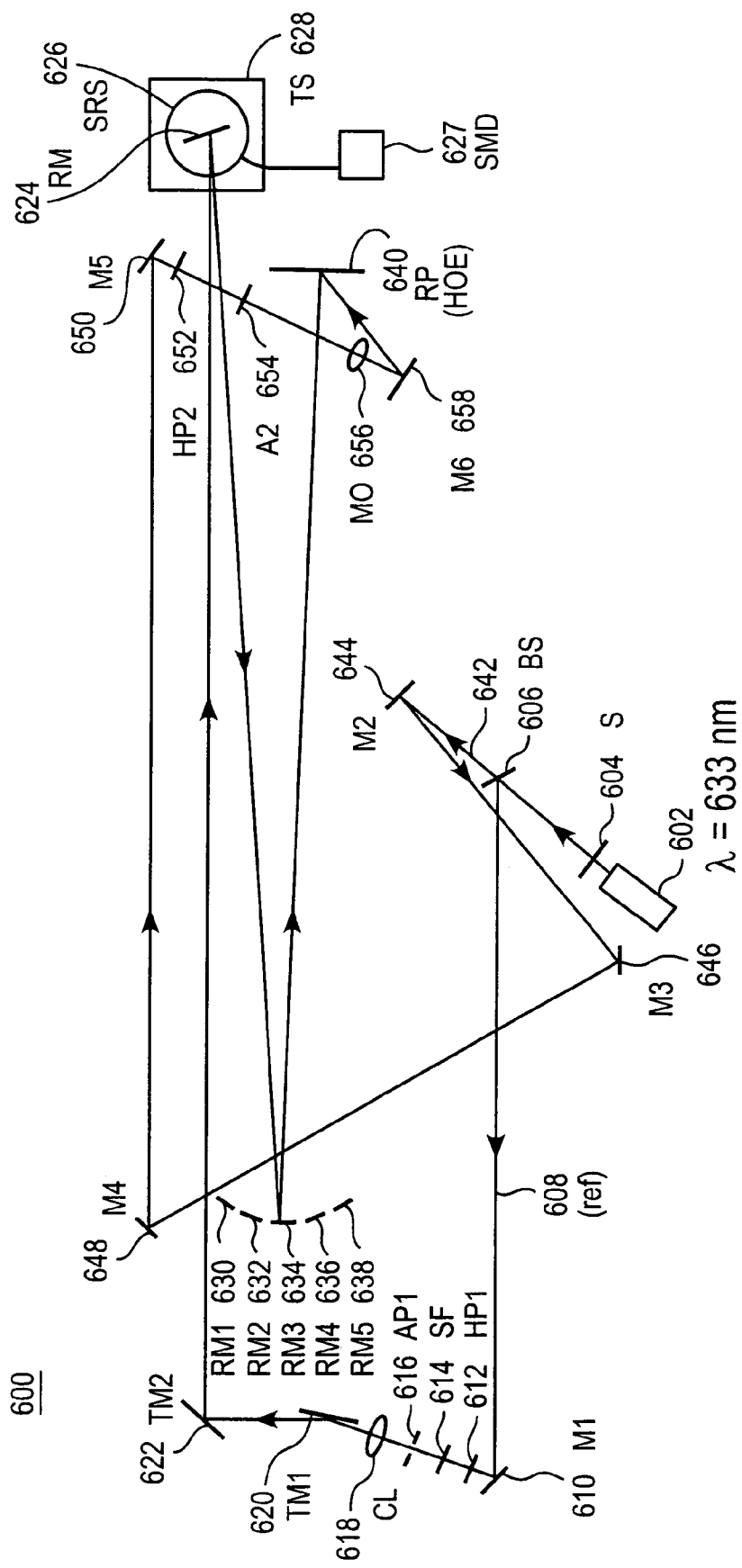
FIG. 6 is a top schematic view of an optical recording geometry for recording an off-axis holographic optical element with multiple reference beams.

An approach for recording an off-axis holographic optical element using multiple reference beams for use in connection with light receiving apparatuses described herein will now be described with reference to FIG. 6. FIG. 6 illustrates an exemplary optical recording arrangement for recording an off-axis HOE using multiple reference beams. The example illustrated in FIG. 6, in particular, provides for using five reference beams, but the approach is not limited to five reference beams. As illustrated in FIG. 6, a laser beam from a laser 602 (e.g., a 35 mW He—Ne laser at 633 nm) passes through a shutter 604 (S) and is split into two beams at a beam splitter 606 (BS). One beam 608 is reflected off the beam splitter 606 and serves as a reference beam. The reference beam 608 is reflected off a mirror 610 (M1) and passes through a half wave plate 612 (HP1) and a spatial filter 614 (SF) (e.g., 10× objective, 25 micron pinhole) through an aperture plate 616 (AP1), and is collimated by a collimating lens 618 (CL). An exemplary collimating lens has a 300 mm focal length. The beam 608 then reflects off a beam steering mirror 620 (TM1) and off another beam steering mirror 622 (TM2) and is directed to a rotation mirror 624 (RM) that is mounted on a servo controlled rotation stage 626 (SRS) driven by a stepper motor drive 627 (SMD). The servo controlled rotation stage 626 is mounted on a tilting stage 628. The beam 608 is reflected from the rotation mirror 624 (RM) onto one of five reference mirrors 630-638 (RM1-RM5) and is directed onto the recording plane 640 (RP) at which the HOE to be recorded is placed.

Using multiple exposures, the reference wavefront from each mirror is sequentially made to interfere with the same object wavefront. Each grating structure generated by interference of the object wave and the individual reference beams is recorded sequentially. Preferably, identical incident power is used for each exposure. In the example of FIG. 6 the reference mirrors 630-638 are aligned to be in the same horizontal plane, and they act to provide multiple sequential reference beams at equal intervals of a desired angle (e.g., 3°) at the recording plane 640 (RP) where the HOE is located. The angle of rotation mirror 624 is initially calibrated with respect to the reference mirrors RM1-RM5 to generate the reference wavefront at, for example, −6°, −3°, 0° (normal illumination), +3° and +6° about the z-axis in the x-y plane. The position of the object wave is unchanged and the resultant HOE recording stores different grating structures. Each grating propagates the wavefront in a different direction. The light concentrator illuminated by a monochromatic light from multiple directions in a plane can focus the light onto a detector having a plane parallel to the table.

Another beam 642 is transmitted through the beam splitter 606 (BS) and is reflected off the mirror 644 (M2) and is directed to and reflected from mirrors 646 (M3), 648 (M4) and 650 (M5). The mirrors 646, 648 and 650 fold the optical beam to provide for optical path length compensation. The beam 642 is directed from mirror 650 (M5) through half-wave plate 652 (HP2) and through aperture plate 654 (A2). The beam 642 is then focused as a spot at mirror 658 (M6) by a microscope objective 656 (MO) (e.g., 40×, 0.65 numerical aperture). The spherical wave thus generated from the mirror 658 provides the desired off-axis object beam and interferes with the reference beam at the recording plane 640 (RP) where the HOE 640 is located. Exemplary parameters for the off-axis angle and the focal distance (optical path length from the objective 656 to the center of the recording plane 640) are approximately 37.7° and 83.4 mm, respectively. By appropriately controlling the rotation mirror 624 to direct the reference beam 608 sequentially off the reference mirror 630-638, a holographic optical element having multiple exposures (i.e., multiple holograms), can be created.

The polarization properties of the reference beam at the recording plane 640 (RP) are changed due to the beam steering device from s-polarization (vertical) to p-polarization (horizontal) relative to the optical table. To compensate for this, the half-wave plate 612 is introduced before the spatial filter 614. The orientation of the half-wave plate 612 is such that, at the recording plane 640 (RP), the reference beam 608 is s-polarized.

The polarization of the object beam 642 has a different orientation relative to each ray of the reference beam 608 illuminating the recording plane. A half wave plate 652 is placed in the object beam 642, and the orientation of the half wave plate 652 (HP2) is aligned such that the polarization of the ray of the object beam 642 at the center of the recording plane 640 (RP) is in a vertical plane. The ratio of intensities of the reference beam and the object beam is approximately unity at the center of the recording plane.

In addition, a plate holder can be used that covers the outer edge (e.g., the outer 3 mm) of the HOE to be recorded at the recording plane 640 (RP) to eliminate the influence of the multiple internal reflections that are produced due to off-axis object beam elimination.

Exemplary optical parameters for recording a holographic optical element with multiple exposures as described above are as follows. The reference beam intensity at the center of the recording plane is 48.3 $\mu$W/cm$^2$±2%. The object beam intensity at the center of the recording plane 640 is 48 $\mu$W/cm$^2$±8%. The total intensity at the center of the recording plane 640 (RP) is approximately 95 $\mu$W/cm$^2$. The exposure time for a single exposure is governed by the relation T=E/P, where E is the exposure sensitivity of the red-sensitive Slavich PFG-01 silver halide emulsion material, for example, and P is the total incident beam intensity on the HOE to be recorded. The exposure sensitivity E for PFG-01 as provided by Slavich is approximately 110 $\mu$J/cm$^2$ for light at 633 nm.

Taking into account the absorption and other parameters of the PFG-01 material, a total intensity of 190 $\mu$W/cm$^2$ was used to record an exemplary holographic optical element with five exposures corresponding to five reference beams. For five exposures, the total intensity falling on the recording plane 640 can be divided equally, yielding approximately 40 $\mu$W/cm$^2$ per exposure. Thus, each of the five exposures is carried out using approximately 40 $\mu$W/cm$^2$ of light at 633 nm.

In the foregoing embodiment, for a given holographic recording material, there will be a total exposure limit, and the multiple exposures combined will preferably not exceed that total exposure limit. Thus, when increasing the number of exposures for recording a given HOE, it is preferable to adjust (reduce) the exposure time (or intensity) for each exposure. Reduction in the exposure time or intensity can also reduce the resulting diffraction efficiency of the HOE. Thus, if a certain efficiency per exposure is desired, this information can be used to determine the total number of exposures that can be recorded in a given area of the HOE. This information can also be used, then, to determine the appropriate angular distance between exposures to achieve acceptable light concentration behavior with the HOE without exceeding the total exposure limit.

After recording the multiple exposures in the HOE material, the HOE can then be developed. For a HOE made using Slavich PFG-01, development can be achieved using CWC-2 developer for three minutes, followed by washing in water for five minutes, followed by bleaching using Amidol bleach for five minutes, followed by a final wash in water for 10 minutes.

Figure 7:
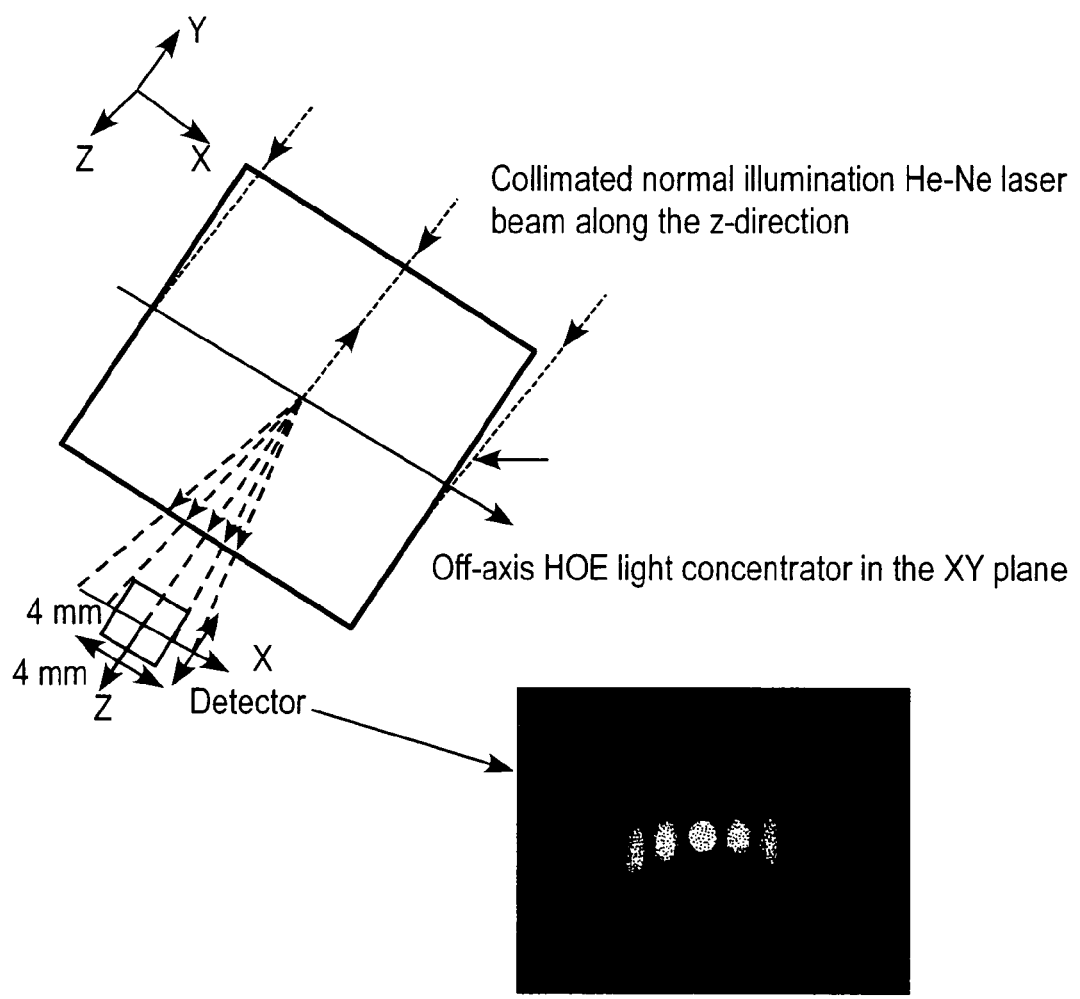
FIG. 7 shows the reconstruction geometry and corresponding diffraction spots for a 5 beam HOE light concentrator.

The reconstruction geometry and the diffracted focal spots corresponding to normal illumination from mirror RM3 are shown in FIG. 7. The central symmetrical circular focal spot in the photograph is due to normal illumination recording and reconstruction. By changing the angle of incidence of the illuminating beam (within the recording angle range) the light concentrator generates an aberration-free focal spot at the same location.

Figure 8:
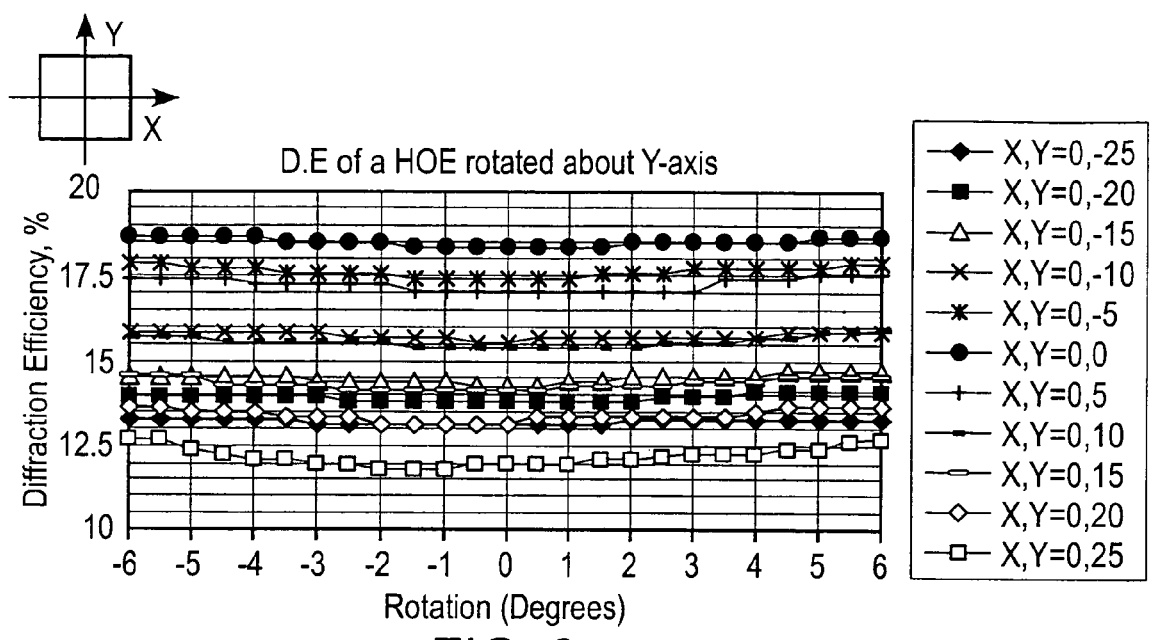
FIG. 8 is a plot of diffraction efficiency of a select area of a 5 beam HOE light concentrator.
Figure 9:
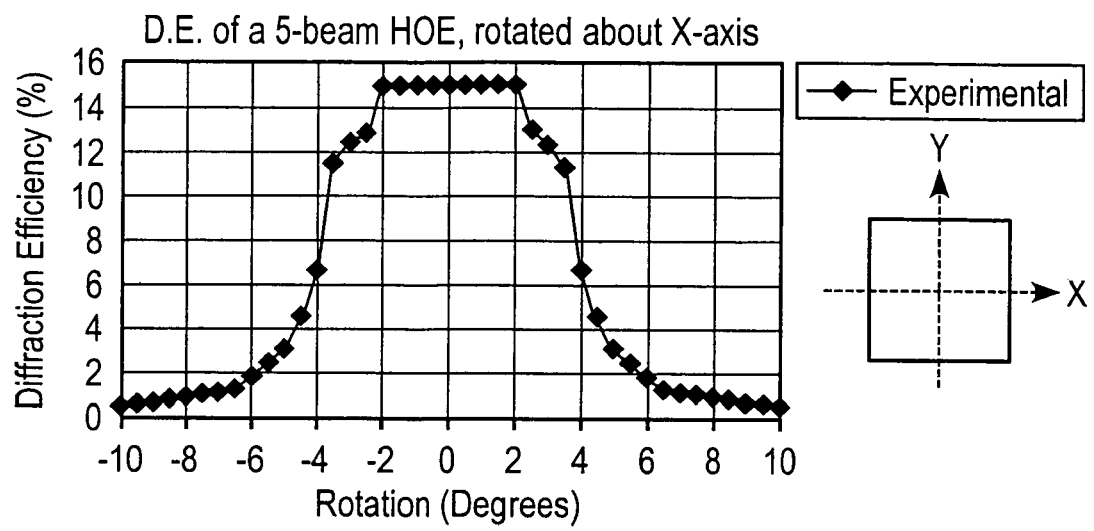
FIG. 9 is a plot of the diffraction efficiency for a 5 beam HOE light concentrator as a function of rotation about the x-axis.
Figure 10:
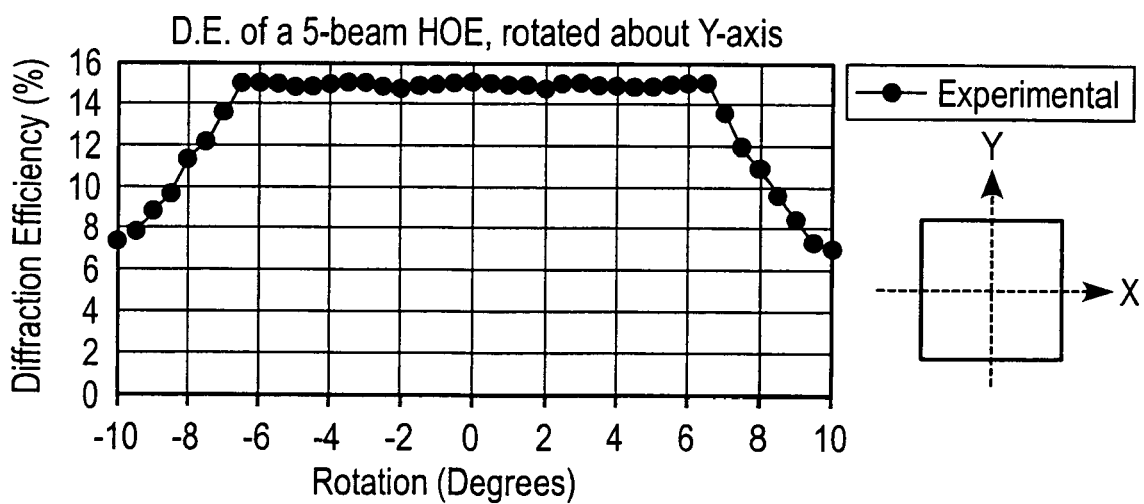
FIG. 10 is a plot of the diffraction efficiency for a 5 beam HOE light concentrator as a function of rotation about the y-axis.

An aperture having a diameter of 1 mm can be placed in front of the normal illumination beam to measure the efficiency of a small area of the HOE along the vertical y-direction (x=0) at the horizontal center of the plate. Diffraction efficiency with respect to the rotation of the HOE about the y-axis is shown in FIG. 8. Efficiency measurements can also be obtained by illuminating the full aperture of the recorded region, and by rotating the HOE with respect to the x- and y-axes from −10° to +10° at intervals of 0.5°. The corresponding graphs for rotation about the x- and y-axes are shown in FIGS. 9 and 10, respectively. Referring to FIG. 10, since the recording geometry is designed for recording with different illumination beams that are confined in the x-z plane (the plane of the table), a substantially uniform efficiency of about 15% for a silver halide HOE measuring 58 mm×58 mm can be obtained. Furthermore, the light concentrator can provide a circular spot at the same location with respect to the recording illumination angles.

The above described example for recording and developing a five exposure HOE at 633 nanometers is exemplary in nature and should not be construed as limiting in any way. If desired, different holographic emulsion materials can be used and/or a different number of exposures can be used to fabricate suitable holographic optical devices and HOEs as described herein.

The example discussed above relating to FIG. 6 pertains to recording a planar HOE at the recording plane 640. However, a cylindrical HOE, a conical HOE, a HOE of another shape with a curved surface, or a HOE with a plurality of planar surfaces oriented normal to different directions can be recorded using the above-described approach by placing the HOE on an appropriate rotation and/or tilting stage to expose different areas of the HOE successively.

For single exposure recording, the object wave interferes with the normal illumination beam from mirror RM3. The recording can be carried out on Slavich PFG-01 holographic plates having a size of 63 mm×63 mm with the emulsion side facing the beams. The area of recording of the HOE is 58 mm×58 mm. Using the geometry described in FIG. 6, the spatial frequency of the slanted grating structure along the vertical y-axis can vary due to a change in the off-axis angle of the object beam. The frequency of the grating at the center of the HOE is about 1000 lines mm$^{-1}$. The recording grating structure on the PFG-01 plate can be developed (e.g., using CWC-2 developer), and bleached (e.g., using Amidol bleach) to obtain a phase element.

The recorded transmission HOE can be reconstructed using the same normal s-polarization illumination beam that was used for the single-exposure recording geometry, with the grating surface facing away from the reference beam. The diffracted beam is a converging spherical wave. Evaluation of the off-axis diffracted spot may be performed using an OPHIR Optronics BeamStar charged coupled detector (CCD) laser beam profiler. This profiler has a rectangular 4.6 mm×6.2 mm CCD that is sensitive from 320 nm to 1100 nm. A photograph of the intensity pattern on the detector is shown in FIG. 11(a). FIG. 11(b) shows the corresponding 3-D profile of the spot. FIG. 11(c) is a table of the Gaussian curve fitting parameters for the spot intensity along both vertical and horizontal directions of the detector plane, which is parallel to the table. FIG. 11(d) shows a plot of the Gaussian fit to spot intensity data along the vertical (top graph) and horizontal (bottom graph) axes. Since the HOE is illuminated with the same reference beam that is used for recording, a substantially circular diffraction spot of about 0.7 mm diameter is obtained.

Figure 12:
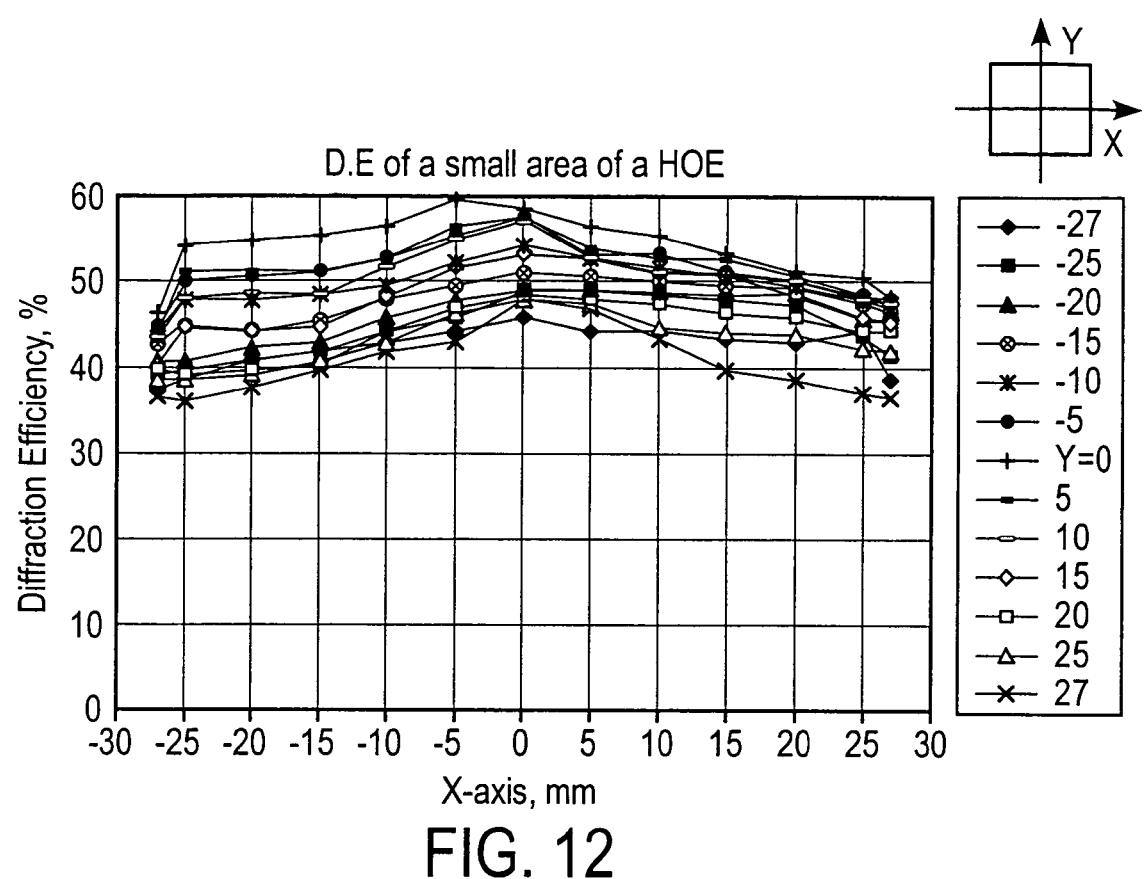
FIG. 12 is a plot of diffraction efficiency for a 1 mm circular area of a HOE recorded by single-beam exposure.

To determine the diffraction efficiency for reconstruction at 633 nm, a mask with a 1 mm diameter aperture can be mounted on an x-y translation stage. The mask is placed in the illumination beam path, which allows efficiency measurements of the HOE to be carried out at discrete spot locations. The beam power is measured using a calibrated Newport silicon detector (Model 818-ST) and a calibrated Newport optical power meter (Model 1830C). The detector is placed parallel to the table and a 4 mm$^2$ area of the detector is used to capture the diffracted beam. As defined herein, "diffraction efficiency" ($\eta_D$) is the ratio of the diffracted beam power to the incident beam power. The diffraction efficiency as a function of HOE coordinates is shown in FIG. 12. Near the center the HOE has a peak efficiency of about 59%, which decreases symmetrically along a given horizontal line to about 80 to 90% of the peak value at a given height.

The efficiency can vary near the vertical edges of the plate. The reduction in efficiency along the vertical direction from the center of the recording plate may be due to one or more of a) over- or under-exposure, or b) deviation from unity of the object-to-reference beam ratio. As disclosed by Syms and Solymar in Appl. Phys. B 1983; 32:165-173 and Kostuk in Proc. SPIE 1461: 24-34; 1991, the non-uniformity in efficiency across the recording plane may be caused by a) deviation from the Bragg condition along the edges, and/or b) variation in off-axis angles between the rays of the object (spherical) and the reference (plane) beams at the recording plane. The diffraction efficiency of the recorded HOE when illuminated with the full beam of 58 mm×58 mm is about 48%, which is approximately equal to the diffraction efficiency of the HOE for s- and p-polarized beams.

Changing the reconstruction incident beam angle or rotating the HOE decreases the efficiency and distorts the symmetric shape of the diffracted spot. FIG. 13(a) shows the diffracted spot when the angle of incidence of the illuminating beam is changed from 0° (normal illumination) to 3° (oblique illumination) by rotating the plate about the vertical axis. FIGS. 13(b)-13(d) show the corresponding data as described with respect to FIG. 11. In comparison, data for the undistorted circular spot (at normal illumination) is shown in FIG. 11.

Figure 14:
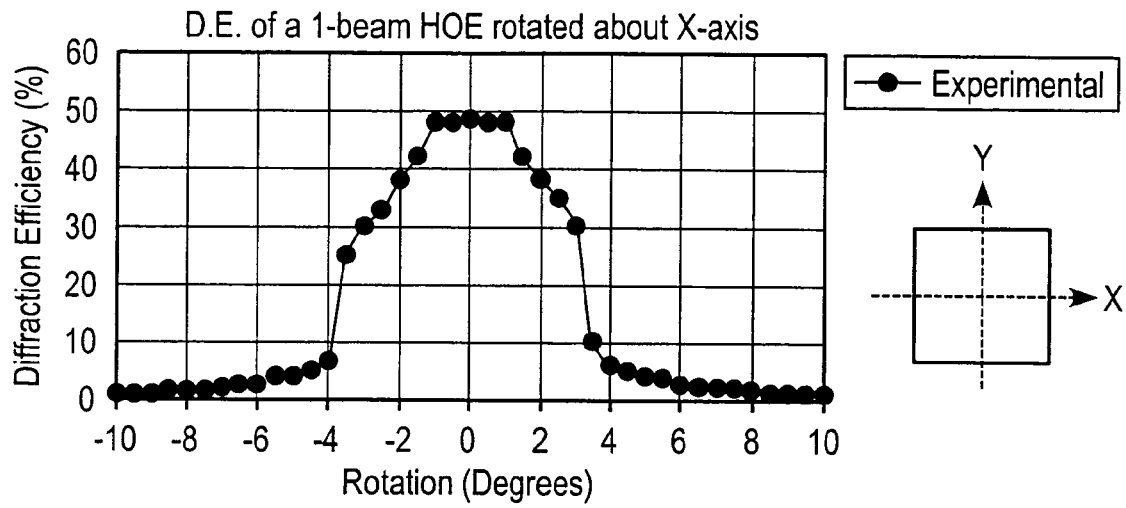
FIG. 14 is a plot of diffraction efficiency as a function of rotation about x-axis.
Figure 15:
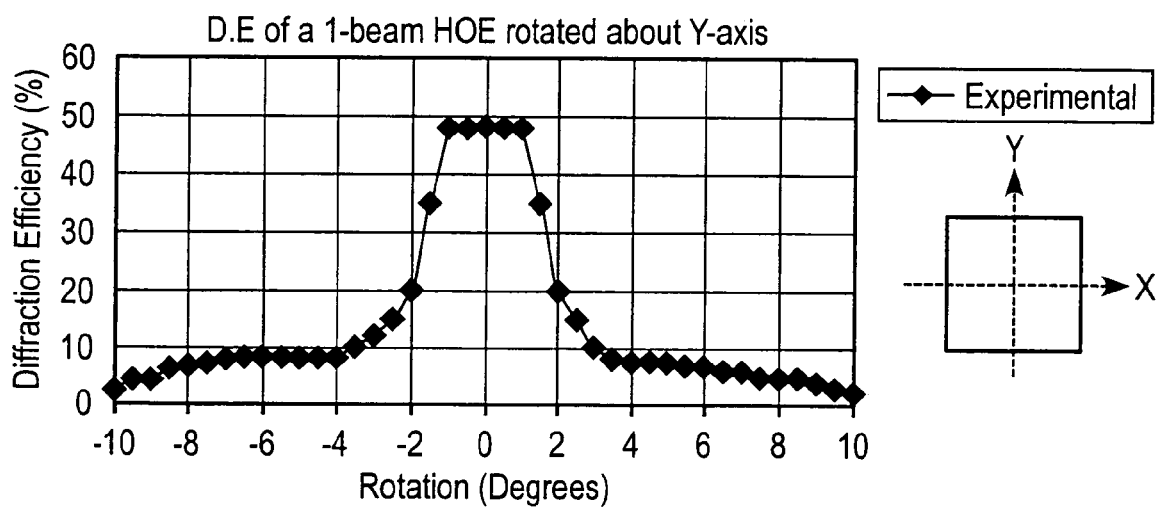
FIG. 15 is a plot of diffraction efficiency as a function of rotation about y-axis.

The diffraction efficiency as a function of rotation of the HOE about the x- and y-axes is shown in FIGS. 14 and 15, respectively. In each of FIGS. 14 and 15, the HOE light concentrator is illuminated with the full identical beam that was used for recording. The efficiency is uniform (and equal) for a rotation of 1° about the vertical and horizontal axes, which is consistent with a single-exposure recording geometry using silver halide recording media.

Various configurations of light receiving apparatuses have been described herein, but other configurations are possible. For example, light apparatuses have been described in conjunction with a single light detector, but the multiple light detectors can be used with a single light receiving apparatus. In addition, light receiving apparatuses as described herein can have a light detector arranged in any suitable orientation. For example, the light detector 108 illustrated in FIG. 1d is shown with the light receiving face being oriented in the plane of the page; however, the plane of the light receiving face could be oriented perpendicular to the plane of the page so as to receive light through HOEs 116.

In addition, various examples of using a light receiving apparatus have been described herein, but other uses are possible. For example, a light receiving apparatus as described herein could be used in financial point-of-sale transactions by incorporating a light receiving apparatus as described herein at a check-out station of a retail store, for example. Products being sold can be equipped with infrared transmitting units in the packages of such products (e.g., smart packages) that can transmit signals comprising information to be detected and processed at the check-out station. Whereas bar codes are presently used to obtain information about a package, the amount of information contained within a bar code is relatively limited. In contrast, utilizing a check-out station comprising a light receiving apparatus as described herein to read information from smart packages having infrared transmitters coupled to associated memories within the packages can provide substantially more information about the package, the information being limited only by the capacity of the package memory.

As another example, a light receiving apparatus as described herein could be placed in an appliance to receive a wireless optical signal from a "smart product" having a wireless optical transmitter embedded in its packaging. For example, a light receiving device as described herein could be placed on the front panel outside the microwave cavity of a microwave oven to receive a wireless optical signal from the package of a food product having a transmitter therein that becomes activated when the package is activated (e.g., mechanically opened) and that transmits cooking instructions to the microwave oven.

As another example, a light receiving apparatus as described herein can be used in conjunction with a photovoltaic cell as a solar cell to increase the intensity of sunlight incident on the cell. Such a light receiving apparatus can advantageously concentrate light from different directions onto a focal area as previously described, and is therefore well suited for concentrating light onto a photovoltaic cell as the sun changes orientation relative to the cell. In this regard, holograms can be recorded in the holographic optical device of light receiving apparatus so as to be compatible with either a broad band of wavelengths present in sunlight or to take advantage of discrete wavelengths for efficient absorption by the cell.

As a further example, a light receiving apparatus as described herein could be utilized in a home setting or a commercial setting for receiving information from a smart package (e.g., a product with smart packaging) and transmit that information directly to a manufacturer, brand owner, or retailer. If the package/product is also equipped with a light receiving apparatus itself, two-way, direct, real-time communication between a consumer and a retailer, manufacturer or a brand owner can be carried out, for example, through the use of sound chips and/or a display on the package.

In addition to the foregoing, the focusing characteristics of the devices described herein can be used in multiple image formation in integrated circuit manufacture; and laser deflecting and/or focusing (e.g., in lasers scanners).

The terms "comprises" and "comprising", when used in this specification, are taken to specify the presence of stated features, steps or components; but the use of these terms does not preclude the presence or addition of one or more other features, steps, components or groups thereof.

The invention has been described with reference to particular embodiments. However, it will be readily apparent to those skilled in the art that it is possible to embody the invention in specific forms other than those of the embodiments described above. This can be done without departing from the spirit of the invention. The embodiments described herein are merely illustrative and should not be considered restrictive in any way. The scope of the invention is given by the appended claims, rather than the preceding description, and all variations and equivalents which fall within the range of the claims are intended to be embraced therein.

What is claimed is:

1. A light receiving apparatus, comprising:
   a holographic optical device having a plurality of holograms recorded in a light receiving surface thereof, wherein the holographic optical device is configured to diffract light of a predetermined wavelength incident thereon from different directions onto a common focal area, and
   wherein the holographic optical device is shaped such that a first vector normal to the light receiving surface at a first location thereon is oriented along a first direction and such that a second vector normal to the light receiving surface at a second location thereon is oriented along a second direction, the second direction being different from the first direction; and
   a light detector positioned at the focal area to receive light focused by the holographic optical device.

2. The light receiving apparatus of claim 1, wherein the holographic optical device comprises a plurality of holographic optical elements having the holograms recorded therein.

3. The light receiving apparatus of claim 2, wherein the plurality of holographic optical elements are arranged edge to edge to surround the focal area.

4. The light receiving apparatus of claim 3, wherein the plurality of holographic optical elements are arranged in a hexagonal configuration or an octagonal configuration.

5. The light receiving apparatus of claim 1, wherein the holographic optical device is configured to receive light from an angular range of up to 360 degrees.

6. The light receiving apparatus of claim 1, wherein the holographic optical device is configured to receive light from an angular range of up to 180 degrees.

7. The light receiving apparatus of claim 1, wherein the holographic optical device is centered about the focal area.

8. The light receiving apparatus of claim 1, wherein the holographic optical device has a cylindrical shape.

9. The light receiving apparatus of claim 1, wherein the holographic optical device has a conical shape.

10. The light receiving apparatus of claim 1, wherein the light detector converts an optical signal to an electrical signal.

11. The light receiving apparatus of claim 1, wherein the predetermined wavelength is an infrared wavelength.

12. The light receiving apparatus of claim 11, wherein the predetermined wavelength is in the range of 845 nm to 905 nm.

13. The light receiving apparatus of claim 1, wherein the light receiving apparatus is configured for mounting on a ceiling.

14. The light receiving apparatus of claim 1, wherein the light receiving apparatus is configured for mounting on a wall.

15. The light receiving apparatus of claim 1, wherein the light receiving apparatus is configured for mounting on a portable computer or hand-held device.

16. A light-communication device comprising the light receiving apparatus of claim 1, and further comprising a processing unit configured to process an optical signal received by the light detector.

17. The light-communication device of claim 16, further comprising a light transmitting element for transmitting another optical signal.

18. The light-communication device of claim 16, wherein the optical signal comprises cigarette manufacturing information and wherein the processing unit is programmed to process the cigarette manufacturing information.

19. The light-communication device of claim 16, wherein the cigarette manufacturing information is quality-control information.

20. The light-communication device of claim 16, wherein the optical signal comprises cigarette inventory information and wherein the processing unit is programmed to process the cigarette inventory information.

21. The light-communication device of claim 16, wherein the optical signal comprises a wireless optical signal.

22. A method of receiving an optical signal, comprising: receiving light of a predetermined wavelength comprising an optical signal with a light receiving apparatus comprising a holographic optical device, the holographic optical device having a plurality of holograms recorded in a light receiving surface thereof,
wherein the holographic optical device is configured to diffract light of the predetermined wavelength incident thereon from different directions onto a common focal area, and
wherein the holographic optical device is shaped such that a first vector normal to the light receiving surface at a first location thereon is oriented along a first direction and such that a second vector normal to the light receiving surface at a second location thereon is oriented along a second direction, the second direction being different from the first direction; and diffracting the light of the predetermined wavelength with the holographic optical device onto the focal area; and
collecting the light of the predetermined wavelength diffracted by the holographic optical device with a light detector positioned at the focal area.

23. The method of claim 22, wherein the holographic optical device comprises a plurality of holographic optical elements having the holograms recorded therein.

24. The method of claim 23, wherein the plurality of holographic optical elements are arranged edge to edge to surround the focal area.

25. The method of claim 24, wherein the plurality of holographic optical elements are arranged in a hexagonal configuration or an octagonal configuration.

26. The method of claim 22, wherein the holographic optical device is configured to receive light from an angular range of up to 360 degrees.

27. The method of claim 22, wherein the holographic optical device is configured to receive light from an angular range of up to 180 degrees.

28. The method of claim 22, wherein the holographic optical device is centered about the focal area.

29. The method of claim 22, wherein the holographic optical device has a cylindrical shape.

30. The method of claim 22, wherein the holographic optical device has a conical shape.

31. The method of claim 22, further comprising converting the optical signal to an electrical signal by the light detector.

32. The method of claim 22, wherein the predetermined wavelength is an infrared wavelength.

33. The method of claim 32, wherein the predetermined wavelength is in the range of 845 nm to 905 nm.

34. The method of claim 22, wherein the light receiving apparatus is mounted on a ceiling of a building.

35. The method of claim 22, wherein the light receiving apparatus is mounted on a wall of a building.

36. The method of claim 22, wherein the light receiving apparatus is mounted on a portable computer or hand-held device.

37. The method of claim 22, further comprising processing the optical signal received by the light detector with a processing unit.

38. The method of claim 22, wherein the light receiving apparatus comprises a light transmitting element, the method further comprising transmitting another optical signal with the light transmitting element.

39. The method of claim 37, wherein the optical signal comprises cigarette manufacturing information, the method comprising processing the cigarette manufacturing information with the processing unit.

40. The method of claim 39, wherein the cigarette manufacturing information is quality-control information.

41. The method of claim 37, wherein the optical signal comprises cigarette inventory information, the method comprising processing the cigarette inventory information with the processing unit.

42. The light receiving apparatus of claim 1, wherein the apparatus is adapted to increase the optical-link distance of an optical wireless link and/or improve the signal-to-noise ratio of an optical signal of a given wavelength.

43. The method of claim 22, wherein the holographic optical device is adapted to increase the optical-link distance of an optical wireless link and/or improve the signal-to-noise ratio of an optical signal of a given wavelength.

44. The light receiving apparatus of claim 1, wherein the holographic optical device is formed on a plastic or polymer sheet comprising a holographic emulsion on one side thereof.

45. The light receiving apparatus of claim 44, wherein the holographic emulsion comprises silver halide or dichromated gelatin.

46. The light receiving apparatus of claim 1, wherein the holographic optical device is formed of a photopolymer.

47. The light receiving apparatus of claim 1, wherein the holographic optical device is configured to receive light from both lateral and vertical directions.

48. The method of claim 22, wherein the holographic optical device is configured to receive light from both lateral and vertical directions.

49. The light-communication device of claim 16, wherein the optical signal comprises integrated circuit manufacturing information and wherein the processing unit is programmed to process the integrated circuit manufacturing information.

50. The method of claim 37, wherein the optical signal comprises integrated circuit manufacturing information, the method comprising processing the integrated circuit manufacturing information with the processing unit.

51. The method of claim 22, wherein the optical signal comprises a wireless optical signal.

* * * * *